United States Patent
Chae et al.

(10) Patent No.: US 12,027,688 B2
(45) Date of Patent: Jul. 2, 2024

(54) METHOD OF MANUFACTURING NEGATIVE ELECTRODE FOR LITHIUM SECONDARY BATTERIES

(71) Applicant: LG CHEM, LTD., Seoul (KR)

(72) Inventors: Oh Byong Chae, Daejeon (KR); Sang Wook Woo, Daejeon (KR); Ye Ri Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 722 days.

(21) Appl. No.: 17/252,119

(22) PCT Filed: Oct. 10, 2019

(86) PCT No.: PCT/KR2019/013289
§ 371 (c)(1),
(2) Date: Dec. 14, 2020

(87) PCT Pub. No.: WO2020/076091
PCT Pub. Date: Apr. 16, 2020

(65) Prior Publication Data
US 2021/0257602 A1 Aug. 19, 2021

(30) Foreign Application Priority Data
Oct. 10, 2018 (KR) .................. 10-2018-0120458

(51) Int. Cl.
*H01M 4/04* (2006.01)
*H01M 4/02* (2006.01)
*H01M 4/38* (2006.01)
*H01M 4/583* (2010.01)

(52) U.S. Cl.
CPC ......... *H01M 4/0404* (2013.01); *H01M 4/382* (2013.01); *H01M 4/386* (2013.01); *H01M 4/583* (2013.01); *H01M 2004/027* (2013.01)

(58) Field of Classification Search
CPC ............. H01M 4/0404; H01M 4/0416; H01M 4/0445; H01M 4/1393; H01M 4/1395; H01M 4/382; H01M 4/386; H01M 4/583; H01M 4/587; H01M 2004/027
See application file for complete search history.

(56) References Cited

U.S. PATENT DOCUMENTS

| | | | |
|---|---|---|---|
| 2005/0064291 A1 | 3/2005 | Sato et al. | |
| 2011/0195293 A1 | 8/2011 | Grant et al. | |
| 2012/0183859 A1 | 7/2012 | Sasaki et al. | |
| 2013/0216907 A1* | 8/2013 | Rayner .................. | B22F 1/06 241/24.1 |
| 2014/0011088 A1* | 1/2014 | Lopatin ................. | H01M 4/386 429/211 |
| 2014/0166491 A1 | 6/2014 | Grant et al. | |
| 2014/0377643 A1 | 12/2014 | Lee et al. | |
| 2015/0024274 A1 | 1/2015 | Sasaki et al. | |
| 2016/0141596 A1* | 5/2016 | Uhm .................... | H01M 4/0435 429/231.95 |
| 2016/0164073 A1* | 6/2016 | Liu ......................... | H01M 4/48 252/512 |
| 2016/0380262 A1 | 12/2016 | Grant et al. | |
| 2017/0047613 A1* | 2/2017 | Iwama .............. | H01M 10/0587 |
| 2017/0110730 A1* | 4/2017 | Tanaka .............. | H01M 10/0525 |
| 2017/0187030 A1* | 6/2017 | Grant .................... | C25D 7/0657 |
| 2017/0338480 A1* | 11/2017 | Kim .................... | H01M 4/1395 |
| 2018/0009665 A1* | 1/2018 | Kawaguchi .......... | H01M 4/1393 |
| 2018/0013143 A1* | 1/2018 | Asakawa .............. | C01G 33/006 |
| 2018/0205114 A1* | 7/2018 | Pauric ..................... | H01M 4/80 |
| 2018/0254526 A1* | 9/2018 | Wiesner .............. | H01M 10/058 |
| 2019/0109321 A1 | 4/2019 | Grant et al. | |
| 2019/0267617 A1* | 8/2019 | Evans .................. | H01M 4/133 |
| 2019/0288273 A1* | 9/2019 | Yang .................. | H01M 10/0563 |
| 2020/0058929 A1* | 2/2020 | Chae .................. | H01M 10/0525 |
| 2020/0313156 A1* | 10/2020 | Toyoshima ............. | H01M 4/62 |

FOREIGN PATENT DOCUMENTS

| | | |
|---|---|---|
| CN | 1599099 A | 3/2005 |
| CN | 102610820 A | 7/2012 |
| CN | 102741316 A | 10/2012 |
| CN | 104521038 A | 4/2015 |
| CN | 106716682 A | 5/2017 |
| CN | 108428563 A | 8/2018 |
| KR | 10-2014-0141488 A | 12/2014 |
| KR | 10-2015-0014676 A | 2/2015 |
| KR | 10-2015-0014877 A | 2/2015 |
| KR | 10-2015-0027167 A | 3/2015 |
| KR | 10-2016-0094652 A | 8/2016 |
| KR | 10-2016-0122380 A | 10/2016 |
| KR | 10-2017-0112106 A | 10/2017 |
| KR | 10-2018-0046574 A | 5/2018 |
| KR | 10-2018-0091058 A | 8/2018 |
| WO | WO 2017/100415 A1 | 6/2017 |

OTHER PUBLICATIONS

International Search Report for PCT/KR2019/013289 (PCT/ISA/210) mailed on Jan. 21, 2020.

* cited by examiner

*Primary Examiner* — Scott J. Chmielecki
(74) *Attorney, Agent, or Firm* — Birch, Stewart, Kolasch & Birch, LLP

(57) ABSTRACT

A method of manufacturing a negative electrode for lithium secondary batteries. With the method, a negative electrode for lithium secondary batteries having excellent cycle performance may be manufactured by performing a process of compressing the negative electrode after pre-lithiation of the negative electrode so that the porosity of the negative electrode after the pre-lithiation is maintained within a certain range.

13 Claims, No Drawings

METHOD OF MANUFACTURING NEGATIVE ELECTRODE FOR LITHIUM SECONDARY BATTERIES

CROSS-REFERENCE TO RELATED APPLICATION

This application claims priority to and the benefit of Korean Patent Application No. 10-2018-0120458, filed Oct. 10, 2018, the disclosure of which is incorporated herein by reference in its entirety.

TECHNICAL FIELD

The present invention relates to a method of manufacturing a negative electrode for lithium secondary batteries, and more particularly, to a method of manufacturing a negative electrode having excellent cycle performance by further performing a process of compressing the negative electrode after pre-lithiation of the negative electrode so that the porosity of the negative electrode after the pre-lithiation is maintained within a certain range.

BACKGROUND ART

As technical development and demand for mobile devices has increased, the demand for secondary batteries as an energy source has increased dramatically. Among such secondary batteries, lithium secondary batteries, which exhibit high energy densities and low operating potentials and have long cycle lifespans and low self-discharge rates, have been commercialized and widely used.

Meanwhile, metal oxides such as $LiCoO_2$, $LiMnO_2$, $LiMn_2O_4$, or $LiCrO_2$ are used as positive electrode active materials constituting a positive electrode in the lithium secondary batteries, and materials such as metal lithium, a carbon-based material such as graphite or activated carbon, or silicon oxides ($SiO_x$), and the like are used as negative electrode active materials constituting a negative electrode. Among the negative electrode active materials, although metal lithium was mainly used in the early days, the metal lithium has a drawback in that, as charge/discharge cycles proceed, lithium atoms grow on s surface of the metal lithium to cause damage to a separator, thereby destroying batteries. As a result, carbon-based materials have been mainly used as the negative electrode active materials. However, because the carbon-based materials have a drawback in that they have only a theoretical capacity as low as 400 mAh/g, various types of research have been conducted to replace the carbon-based materials using silicon (Si)-based materials having a high theoretical capacity (4,200 mAh/g) as the negative electrode active materials.

The lithium secondary batteries are charged and discharged by repeating a process of intercalation and deintercalation of lithium ions between a positive electrode active material of a positive electrode and a negative electrode active material of a negative electrode.

In theory, the intercalation and deintercalation of lithium ions into/from the negative electrode active material is completely reversible, but in practice, more lithium is consumed than the theoretical capacity of the negative electrode active material and only a part of the lithium is recovered during discharging. Therefore, after the second cycle, a smaller amount of the lithium ions are intercalated during charging, or almost all of the intercalated lithium ions are deintercalated during discharging. As such, a difference in capacity appearing in the first charge/discharge reaction refers to an irreversible capacity loss. In this case, because commercialized lithium secondary batteries are manufactured in a state in which lithium ions are supplied to a positive electrode and no lithium is present in a negative electrode, it is important to minimize the irreversible capacity loss during initial charging and discharging.

Such an initial irreversible capacity loss is known to be mainly due to an electrolyte decomposition reaction on a surface of the negative electrode active material, and a solid electrolyte interface (SEI) film is formed on the surface of the negative electrode active material by means of an electrochemical reaction through the electrolyte decomposition. The formation of such an SEI film has a disadvantage in that it causes the irreversible capacity loss because a large amount of lithium ions are consumed. However, because the SEI film formed in the early charging stage prevents a reaction of lithium ions with the electrode or other materials during charging and discharging, and serves as an ion tunnel to pass only lithium ions through the ion tunnel, the SEI film inhibits further electrolyte decomposition reactions, thereby contributing to the improvement of cycle characteristics of the lithium secondary battery.

Therefore, methods are needed to improve the initial irreversible capacity loss caused by the formation of the SEI film, and the like. One of the methods includes a method of performing pre-lithiation before the manufacture of a lithium secondary battery so that the lithium secondary battery undergoes side reactions occurring during the first charge cycle in advance. As described above, when the pre-lithiation is performed, the first cycle proceeds in a state in which the initial irreversible capacity loss is as low as the capacity loss caused while charging/discharging the secondary battery actually manufactured, thereby reducing the initial irreversible capacity loss.

Meanwhile, an increase in the porosity of the negative electrode is caused as the negative electrode expands while charging the negative electrode during the pre-lithiation of the negative electrode. A cell has a drawback in that its cycle performance may be degraded when the cell is assembled using such an electrode having an increased porosity.

Therefore, there is a demand for a method of manufacturing a negative electrode for lithium secondary batteries whose cycle performance is maintained without any degradation even after pre-lithiation.

[Prior-Art Document]
[Patent Document]
KR 2015-0014877 A

DISCLOSURE

Technical Problem

Therefore, it is an object of the present invention to provide a method of manufacturing a negative electrode for lithium secondary batteries capable of preventing the degradation of the cycle performance of a negative electrode even after pre-lithiation of the negative electrode.

Technical Solution

To achieve the above object, according to one aspect of the present invention, there is provided a method of manufacturing a negative electrode for lithium secondary batteries, which includes:

forming a negative electrode active material layer on a negative electrode current collector to form a negative electrode;

manufacturing a pre-lithiated negative electrode by impregnating the negative electrode with a pre-lithiation solution to perform a pre-lithiation process; and compressing the pre-lithiated negative electrode to adjust a porosity of the pre-lithiated negative electrode so that the porosity of the pre-lithiated negative electrode is in a range of 20% to 45%.

According to another aspect of the present invention, there is provided a method of manufacturing a lithium secondary battery, which includes the method of manufacturing a negative electrode for lithium secondary batteries.

Advantageous Effects

According to the manufacturing method of the present invention, a negative electrode for lithium secondary batteries having excellent cycle performance can be manufactured by further performing a process of compressing the negative electrode after pre-lithiation of the negative electrode so that the porosity of the negative electrode after the pre-lithiation is maintained within a certain range.

BEST MODE

Hereinafter, the present invention will be described in further detail.

It should be understood that the terms or words used in the specification and appended claims should not be construed as limited to general or dictionary meanings, but interpreted based on the meanings and concepts corresponding to technical aspects of the present invention on the basis of the principle that the inventor is allowed to define terms appropriately for the best explanation.

Method of Manufacturing Negative Electrode

The present invention provides a method of manufacturing a negative electrode for lithium secondary batteries, which includes:

forming a negative electrode active material layer on a negative electrode current collector to manufacture a negative electrode;

manufacturing a pre-lithiated negative electrode by impregnating the negative electrode with a pre-lithiation solution to perform a pre-lithiation process; and compressing the pre-lithiated negative electrode to adjust the porosity of the pre-lithiated negative electrode so that the porosity of the pre-lithiated negative electrode is in a range of 20% to 45%.

In the formation of the negative electrode active material layer to manufacture the negative electrode, the negative electrode may be manufactured by dissolving or dispersing a negative electrode active material, a conductive material and/or a binder in a solvent to prepare a negative electrode mixture, coating at least one surface of a negative electrode current collector with the negative electrode mixture, and compressing the negative electrode current collector.

The negative electrode active material may include a silicon-based negative electrode active material and a carbon-based negative electrode active material at a weight ratio of the silicon-based negative electrode active material to the carbon-based negative electrode active material is 1:99 to 50:50, preferably 5:95 to 20:80.

When the silicon-based negative electrode active material is included within this range, it is difficult to increase energy density, which makes it difficult to achieve high-capacity in batteries. On the other hand, when the silicon-based negative electrode active material is included beyond this range, an increase in degree of volume expansion of the negative electrode may be caused.

Meanwhile, the negative electrode current collector is not particularly limited as long as it has high conductivity without causing any chemical change in batteries. For example, copper, stainless steel, aluminum, nickel, titanium, calcined carbon, copper or stainless steel whose surface has been treated with carbon, nickel, titanium, silver, etc., an aluminum-cadmium alloy, or the like may be used. Also, the negative electrode current collector may enhance a bonding force of the negative electrode active material when fine irregularities are formed on a surface of the negative electrode current collector. For example, the negative electrode current collector may also be used in various forms such as films, sheets, foil, nets, porous bodies, foams, and non-woven fabrics.

The negative electrode active material may be included at a content of 80 to 99% by weight, and more particularly 85 to 98% by weight, based on the total weight of the negative electrode active material layer. When the negative electrode active material is included within this range, the negative electrode active material may exhibit excellent capacity characteristics.

The conductive material is used to impart conductivity to electrodes. In batteries thus configured, the conductive material may be used without particular limitation as long as it has electronic conductivity without causing any chemical change. Specific examples of the conductive material include graphite such as natural graphite, artificial graphite, or the like; carbon-based materials such as carbon black, acetylene black, Ketjen black, channel black, furnace black, lamp black, thermal black, carbon fibers, and the like; metal powders or metal fibers of copper, nickel, aluminum, silver, and the like; conductive whiskers such as zinc oxide, potassium titanate, and the like; conductive metal oxides such as titanium oxide, and the like; or conductive polymers such as polyphenylene derivatives, and the like, which may be used alone or in combination of two or more thereof. The conductive material may be included at a content of 1% by weight to 30% by weight, based on the total weight of the negative electrode active material layer.

Also, the binder serves to improve adhesion between negative electrode active material particles and an adhesive force between the negative electrode active material and the current collector. Specific example of the binder include polyvinylidene fluoride (PVDF), a vinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), sulfonated EPDM, a styrene butadiene rubber (SBR), a fluorinated rubber, various copolymers thereof, or the like, which may be used alone or in combination of two or more thereof. The binder may be included at a content of 1% by weight to 30% by weight, based on the total weight of the negative electrode active material layer.

Meanwhile, the solvent used to prepare a negative electrode mixture may include solvents commonly used in the related art. For example, dimethyl sulfoxide (DMSO), isopropyl alcohol, N-methylpyrrolidone (NMP), acetone, water, or the like may be used alone or in combination of two or more thereof. An amount of the solvent used may be properly adjusted in consideration of a coating thickness of slurry, manufacturing yield, viscosity, and the like.

The pre-lithiation process may be performed by electrochemically charging the negative electrode using a lithium metal as a counter electrode after the negative electrode is impregnated with the pre-lithiation solution.

The pre-lithiation solution is a solution including an ionizable lithium salt and an organic solvent, and corresponds to a typical electrolyte solution.

The ionizable lithium salt includes Li+ as a positive ion, and one or more selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $B_{10}Cl_{10}^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $CH_3SO_3^-$, $CF_3(CF_2)_7SO_3^-$, $CF_3CO_2^-$, $CH_3CO_2^-$, $SCN^-$, and $(CF_3CF_2SO_2)_2N^-$, which may be used as a negative ion.

One or more selected from a cyclic carbonate-based organic solvent selected from the group consisting of ethylene carbonate, 1,2-butylene carbonate, 2,3-butylene carbonate, 1,2-pentylene carbonate, 2,3-pentylene carbonate, vinylene carbonate, and fluoroethylene carbonate (FEC); a linear carbonate-based organic solvent selected from the group consisting of dimethyl carbonate, diethyl carbonate, dipropyl carbonate, ethyl methyl carbonate, methyl propyl carbonate, and ethyl propyl carbonate; a linear ester-based organic solvent selected from the group consisting of methyl acetate, ethyl acetate, propyl acetate, methyl propionate, ethyl propionate, propyl propionate, and butyl propionate may be used as the organic solvent The impregnation may be performed at a temperature of 10° C. to 200° C. for 2 hours to 48 hours, and preferably performed at a temperature of 20° C. to 70° C. for 2 hours to 36 hours.

When the impregnation temperature and time are less than 10° C. and less than 2 hours, the pre-lithiation may not be sufficiently performed. On the other hand, when the impregnation temperature is a temperature greater than 200° C., a lithium metal may melt, which makes it difficult to maintain the shape of the lithium metal, and, when the impregnation time is 48 hours, the pre-lithiation may be sufficiently performed. Therefore, the negative electrode does not need to be impregnated beyond this impregnation temperature and time.

The charging may be performed to 5% to 35% of the charge capacity at a current density of 0.1 mA/cm² to 10 mA/cm². More particularly, the charging may be performed to 7% to 33% of the charge capacity at a current density of 0.2 mA/cm² to 8 mA/cm².

When the current density is less than 0.1 mA/cm², the pre-lithiation may not be smoothly performed and many side reactions may occur. On the other hand, when the current density is greater than 10 mA/cm², rapid deformation of the electrode and lithium (Li) plating may occur during the pre-lithiation.

When charging is performed to less than 5% of the charge capacity, the initial efficiency of the negative electrode may not be greatly improved, and a polymer film may not be stably formed. On the other hand, when charging is performed to greater than 35% of the charge capacity, an imbalance between the positive electrode and negative electrode may be caused due to the very high initial efficiency of the negative electrode, and a very thick polymer film may be formed.

Meanwhile, the manufacturing of the pre-lithiated negative electrode may include impregnating and/or charging the negative electrode with the pre-lithiation solution to perform a pre-lithiation process; and washing the negative electrode with an organic solvent.

The washing may be performed at a temperature of 10° C. to 200° C. for 1 minute to 3 hours using the organic solvent. When the temperature is less than 10° C., the washing may not be sufficiently performed due to a solidified lithium salt. On the other hand, when the temperature is greater than 200° C., the electrode may be damaged by heat. Also, when the washing time is less than 1 minute, the lithium salt may not be sufficiently washed. On the other hand, when the washing time is greater than 3 hours, the electrode active material may be peeled off, thereby causing damage to the electrode.

One selected from organic solvents used in the aforementioned pre-lithiation solution may be used as the organic solvent.

In the compressing of the pre-lithiated negative electrode to adjust the porosity of the pre-lithiated negative electrode, the compressing of the pre-lithiated negative electrode active material layer may be performed at a linear pressure of 0.1 kN/cm to 30 kN/cm, preferably 1 kN/cm to 10 kN/cm.

When the linear pressure is less than 0.1 kN/cm, the negative electrode may not be sufficiently compressed to a desired porosity. On the other hand, when the linear pressure is greater than 30 kN/cm, the electrode may be damaged.

In the present invention, the porosity of the negative electrode after being adjusted through the compression may be in a range of 20% to 45%, and particularly in a range of 25% to 35%.

Because an increased porosity of the electrode after the pre-lithiation may be lowered by compression (rolling), when the porosity of the negative electrode falls within a range of 20% to 45%, the resistance during charging and discharging may be lowered due to improved contact between the active materials, thereby improving first-cycle charge/discharge efficiency and cycle performance. When the porosity is greater than 45%, the resistance during charging and discharging may rise significantly due to bad contact between the active materials. On the other hand, when the porosity is less than 20%, resistance may rise due to poor impregnability of the electrolyte solution, and the active material may be broken, thereby causing damage to the electrode.

According to the present invention, the porosity is calculated by the following Equation 1.

Porosity (%)=[1−(Real density/True density)]×100    [Equation 1]

wherein the real density is a density of a negative electrode active material layer including pores; and true density is a density of solids (i.e., solids constituting the negative electrode active material layer) without pores.

The true density can be measured by a pycnometer. When water serving as a dispersion medium is put into a pycnometer cell, and a solid sample to be measured is then put into the pycnometer cell, a volume of the solid sample may be calculated from an increased height of the dispersion medium. Then, the true density of the solid sample may be obtained by dividing a mass of the added solid sample by the volume of the solid sample. In this case, the true density of the solid sample may be determined by calculating a true density of each of solids constituting the negative electrode active material layer, that is, a true density of each of powders of a negative electrode active material, a conductive material, a binder, and a thickening agent, followed by calculating a true density of a mixed powder using ratios of the components included in the negative electrode active material layer.

Meanwhile, the real density of the electrode may be calculated by calculating a volume from a width, a length, and a thickness of the negative electrode active material layer loaded onto the current collector and dividing the mass of the negative electrode active material layer by a volume of the negative electrode active material layer.

Method of Manufacturing Lithium Secondary Battery

In the present invention, there is provided a method of manufacturing a lithium secondary battery, which includes the aforementioned method of manufacturing a negative electrode for lithium secondary batteries.

For example, the method of manufacturing a lithium secondary battery according to the present invention includes:

manufacturing a pre-lithiated negative electrode for lithium secondary batteries using the aforementioned method of manufacturing a negative electrode according to the present invention, followed by manufacturing an electrode assembly including a negative electrode, a positive electrode, and a separator and accommodating the electrode assembly into a battery container; and injecting an electrolyte solution into the battery container, followed by sealing the battery container.

The lithium secondary battery may be manufactured according to a conventional method of manufacturing a secondary battery, except that the negative electrode manufactured by the manufacturing method of the present invention is used.

In the secondary battery, the positive electrode includes a positive electrode current collector and a positive electrode active material layer disposed on at least one surface of the positive electrode current collector.

The positive electrode may be manufactured according to a conventional method of manufacturing a positive electrode as generally known in the related art. For example, the positive electrode may be manufactured by dissolving or dispersing components constituting the positive electrode active material layer, that is, a positive electrode active material, a conductive material and/or a binder, in a solvent to prepare a positive electrode mixture, coating at least one surface of a positive electrode current collector with the positive electrode mixture, and drying and compressing the positive electrode current collector, or may be manufactured by casting the positive electrode mixture onto a separate support, exfoliating films from the support, and laminating the resulting films on a positive electrode current collector.

The positive electrode current collector is not particularly limited as long as it has high conductivity without causing any chemical change in batteries. For example, copper, stainless steel, aluminum, nickel, titanium, calcined carbon, copper or stainless steel whose surface has been treated with carbon, nickel, titanium, silver, etc., an aluminum-cadmium alloy, or the like may be used as the positive electrode current collector. Also, the positive electrode current collector may typically have a thickness of 3 μm to 500 μm, and may enhance an adhesive force of the positive electrode active material when fine irregularities are formed on a surface of the current collector. For example, the positive electrode current collector may also be used in various forms such as films, sheets, foil, nets, porous bodies, foams, non-woven fabrics, and the like.

As the positive electrode active material, layered compounds such as lithium cobalt oxide ($LiCoO_2$), lithium nickel oxide ($LiNiO_2$), and the like, or compounds substituted with one or more transition metals; lithium manganese oxides such as Formula $Li_{1+y}Mn_{2-y}O_4$ (wherein y is in a range of 0 to 0.33), $LiMnO_3$, $LiMn_2O_3$, $LiMnO_2$, and the like; lithium copper oxide ($Li_2CuO_2$); vanadium oxides such as $LiV_3O_8$, $LiFe_3O_4$, $V_2O_5$, $Cu_2V_2O_7$, and the like; Ni site-type lithium nickel oxides represented by Formula $LiNi_{1-y}M_yO_2$ (wherein M is Co, Mn, Al, Cu, Fe, Mg, B, or Ga, and y is in a range of 0.01 to 0.3); lithium manganese composite oxides represented by Formula $LiMn_{2-y}M_yO_2$ (wherein M is Co, Ni, Fe, Cr, Zn, or Ta, and y is in a range of 0.01 to 0.1), or $Li_2Mn_3MO_8$ (wherein M is Fe, Co, Ni, Cu, or Zn); $LiMn_2O_4$ in which Li moieties of the Formula are substituted with alkaline earth metal ions; disulfide compounds; $Fe_2(MoO_4)_3$, and the like may be used, but the present invention is not limited thereto.

Also, the binder and conductive material may be as described above for the negative electrode.

Meanwhile, in the secondary battery, the separator serves to separate the negative electrode and the positive electrode and provide a passage for lithium ions. In this case, a separator may be used without particular limitation as long as it is used as a separator in conventional secondary batteries. In particular, a separator having low resistance to ionic movement of electrolytes and an excellent electrolyte impregnation ability is preferably used. Specifically, porous polymer films, for example, porous polymer films prepared from polyolefin-based polymers such as an ethylene homopolymer, a propylene homopolymer, an ethylene/butene copolymer, an ethylene/hexene copolymer, an ethylene/methacrylate copolymer, and the like, or laminated structure of two or more types thereof may be used. Also, conventional porous non-woven fabrics, for example, non-woven fabrics made of high-melting-point glass fibers, polyethylene terephthalate fibers, and the like may also be used. Also, in order to ensure heat resistance or mechanical strength, a coated separator that includes a ceramic component or polymer material and is optionally in a single-layer or multi-layer structure may be used Meanwhile, an organic liquid electrolyte, an inorganic liquid electrolyte, a solid polymer electrolyte, a gel-type polymer electrolyte, a solid inorganic electrolyte, a molten inorganic electrolyte, and the like, all of which may be used to manufacture the secondary batteries may be used as the electrolyte, but the present invention is not limited thereto.

Specifically, the electrolyte may include an organic solvent and a lithium salt.

The organic solvent may be used without particular limitation as long as it can serve as a medium through which ions participating in an electrochemical reaction of the battery may move. Specifically, ester-based solvents such as methyl acetate, ethyl acetate, γ-butyrolactone, ε-caprolactone, and the like; ether-based solvents such as dibutyl ether or tetrahydrofuran, and the like; ketone-based solvents such as cyclohexanone, and the like; aromatic hydrocarbon-based solvents such as benzene, fluorobenzene, and the like; carbonate-based solvents such as dimethyl carbonate (DMC), diethyl carbonate (DEC), methyl ethyl carbonate (MEC), ethyl methyl carbonate (EMC), ethylene carbonate (EC), propylene carbonate (PC), and the like; alcohol-based solvents such as ethyl alcohol, isopropyl alcohol, and the like; nitriles such as Ra—CN (wherein R is a linear, branched, or cyclic hydrocarbon group having 2 to 20 carbon atoms, which may include a double-bonded aromatic ring or an ether bond), and the like; amides such as dimethylformamide, and the like; dioxolanes such as 1,3-dioxolane, and the like; sulfolane; and the like may be used as the organic solvent. Among these, the carbonate-based solvent is preferred, and a mixture of a low-viscosity linear carbonate-based compound (for example, ethyl methyl carbonate, dimethyl carbonate, diethyl carbonate, or the like) and a cyclic carbonate (for example, ethylene carbonate, propylene carbonate, or the like) having high ionic conductivity and a high dielectric constant, which may enhance the charge-discharge performance of the battery, is more preferred. In this case, when a mixture obtained by mixing a cyclic carbonate and a chain-type carbonate at a volume ratio of approximately 1:1 to 9 is used, excellent performance of an electrolyte solution may be exhibited.

The lithium salt may be used without particular limitation as long as it is a compound that can provide lithium ions used in the lithium secondary battery. Specifically, $LiPF_6$, $LiClO_4$, $LiASF_6$, $LiBF_4$, $LiSbF_6$, $LiAlO_4$, $LiAlCl_4$, $LiCF_3SO_3$, $LiCAF_9SO_3$, $LiN(C_2F_5SO_3)_2$, $LiN(C_2F_5SO_2)_2$, $LiN(CF_3SO_2)_2$, $LiCl$, $LiI$, $LiB(C_2O_4)_2$, or the like may be used as the lithium salt. It is desirable that a concentration of the lithium salt is in a range of 0.1 M to 2.0 M. When the lithium salt is included in this concentration range, an electrolyte may have proper conductivity and viscosity, thereby exhibiting excellent electrolyte performance and promoting effective movement of lithium ions.

In addition to the electrolyte components, the electrolyte may further include one or more additives selected from haloalkylene carbonate-based compounds such as difluoroethylene carbonate, and the like; or pyridine, triethyl phosphite, triethanolamine, a cyclic ether, ethylene diamine, n-glyme, hexaphosphate triamide, a nitrobenzene derivative, sulfur, a quinoneimine dye, N-substituted oxazolidinone, N,N-substituted imidazolidine, an ethylene glycol dialkylether, an ammonium salt, pyrrole, 2-methoxyethanol, or aluminum trichloride, and the like for the purpose of improving lifespan characteristics of the battery, inhibiting the capacity loss of the battery, improving the discharge capacity of the battery, and the like. In this case, the additive may be included at a content of 0.1% by weight to 5% by weight, based on the total weight of the electrolyte.

MODE FOR INVENTION

EXAMPLES

Hereinafter, the present invention will be described in detail with reference to exemplary embodiments thereof. However, it should be understood that the following examples are given for the purpose of illustration of the present invention only, and are not intended to limit the scope of the present invention.

Example 1

Manufacture of Negative Electrode

92% by weight of a negative electrode active material (graphite:SiO=7:3), 3% by weight of a conductive material (Denka black), 3.5% by weight of a binder (SBR), and 1.5% by weight of a thickening agent (CMC) were added to water to prepare a negative electrode active material slurry. One surface of a copper current collector was coated with the prepared negative electrode active material slurry, dried, and then compressed to manufacture a negative electrode having a porosity of 28%.

The porosity may be determined by the following Equation 1.

Porosity (%)=[1−(Real Density/True Density]×100    [Equation 1]

wherein the real density represents a density of a negative electrode active material layer including pores, and the true density represents a density of solids (i.e., solids constituting the negative electrode active material layer) including no pores.

Specifically, 100 mL of water serving as a dispersion medium was put into a Gay-Lussac pycnometer cell, and 10 g of a graphite negative electrode active material powder was then added thereto. In this case, a volume of the graphite powder was determined to be 4.44 mL from the increased height of the dispersion medium. The true density was calculated as 2.25 g/mL by dividing a mass of the graphite powder by the volume of the graphite powder. At the time of measurement, the temperature was 25° C., and the pressure was 1 atm. Each of the true densities of powders of a SiO negative electrode active material, a conductive material (Denka black), a binder (SBR), and a thickening agent (CMC) was calculated in the same manner. Thereafter, by applying a mixing ratio of 92:3:3.5:1.5 of a negative electrode active material (graphite:SiO=7:3), a conductive material (Denka black), a binder (SBR), and a thickening agent (CMC), which constituted a negative electrode, a true density of the mixed solids constituting a negative electrode active material layer was calculated to be 2.10 g/mL.

Meanwhile, it can be seen that the real density of the electrode was 1.51 g/mL when a volume of a negative electrode active material layer was calculated from a width, a length, and a thickness of the negative electrode active material layer loaded onto the current collector and the mass of the negative electrode active material layer was divided by a volume of the negative electrode active material layer.

When the true and real densities thus calculated are applied to Equation 1, the porosity of the negative electrode was determined to be 28%, as described above.

Pre-Lithiation by Electrochemical Charge

2% by weight of fluoroethylene carbonate (FEC) was added to a solvent in which ethylene carbonate (EC) and ethyl methyl carbonate (EMC) were mixed at a volume ratio of 3:7, and $LiPF_6$ was dissolved therein to a concentration of 1 M to prepare an electrolyte solution (i.e., a pre-lithiation solution).

The negative electrode manufactured as described above was cut into pieces with a size of 10 cm×10 cm, and then impregnated with the electrolyte solution at a temperature of 25° C. for 3 hours. Thereafter, the negative electrode was electrochemically charged using a lithium metal as a counter electrode, in a state in which the electrolyte solution remained in the negative electrode, to perform a pre-lithiation process on the negative electrode. In this case, the current density was set to 2 mA/cm², and the negative electrode was charged to 25% of the charge capacity.

The negative electrode that had been subjected to the pre-lithiation was washed with EMC, and then dried at room temperature to manufacture a pre-lithiated negative electrode. The porosity of the negative electrode thus manufactured was measured to be 54% (a method of measuring porosity was as described above). In this case, because it was difficult to accurately determine the true density due to changes in volumes of the electrode active material and the surface film during the pre-lithiation process, the same value as the true density during the manufacture of the negative electrode may be used as the true density for the sake of convenience.

Electrode Compression

The electrode manufactured as described above was compressed at a linear pressure of 5 kN/cm using a roll press so that the porosity of the electrode was 30% (a method of measuring porosity was as described above).

Manufacture of Lithium Secondary Battery

A polyolefin separator was interposed between a LiCoO$_2$ positive electrode and the pre-lithiated negative electrode manufactured as described above, and an electrolyte solution obtained by adding 2% by weight of FEC to a solvent in which EC and EMC were mixed at a volume ratio of 3:7 and dissolving LiPF$_6$ to a concentration of 1 M was then injected thereto to manufacture a coin-type full cell.

In the following Examples and Comparative Example, the method of measuring porosity was as described above in Example 1.

Example 2

A coin-type full cell was manufactured in the same manner as in Example 1, except that, during the compression, the negative electrode was compressed so that the porosity of the negative electrode was 32%.

Examples 3 to 6

Coin-type full cells were manufactured in the same manner as in Example 1, except that, during the compression, a negative electrode was compressed so that the porosities of the negative electrodes were 22%, 25%, 35%, and 40%, respectively.

Comparative Example 1

A coin-type full cell was manufactured in the same manner as in Example 1, except that the electrode was not compressed.

Comparative Example 2

A coin-type full cell was manufactured in the same manner as in Example 1, except that, during the compression, the negative electrode was compressed so that the porosity of the negative electrode was 51%.

Comparative Example 3

A coin-type full cell was manufactured in the same manner as in Example 1, except that, during the compression, the negative electrode was compressed so that the porosity of the negative electrode was 18%.

Comparative Example 4

A coin-type full cell was manufactured in the same manner as in Example 1, except that, during the compression, the negative electrode was compressed so that the porosity of the negative electrode was 15%.

Experimental Example 1: Cycle Charge/Discharge Experiment

Reversibility tests were conducted on the coin-type full cells manufactured in Examples and Comparative Examples using an electrochemical charger/discharger. The coin-type full cells were charged by applying a current at a current density of 0.1 C rate to a voltage of 4.2 V (vs. Li/Li$^+$) during charging and discharged at the same current density to a voltage of 2.5 V during discharging. A 100-cycle capacity retention rate was compared to the first-cycle charge/discharge efficiency and the first-cycle discharge capacity. The results are listed in the following Table 1.

TABLE 1

|  | Porosity (%) After Pre-lithiation (Compression) | First-Cycle Charge/Discharge Efficiency (%) | 100-Cycle Capacity Retention Rate (%) |
|---|---|---|---|
| Comparative Example 1 | 54 | 86 | 82 |
| Comparative Example 2 | 51 | 87 | 84 |
| Example 6 | 40 | 99 | 90 |
| Example 5 | 35 | 101 | 92 |
| Example 2 | 32 | 101 | 92 |
| Example 1 | 30 | 103 | 93 |
| Example 4 | 25 | 101 | 93 |
| Example 3 | 22 | 100 | 92 |
| Comparative Example 3 | 18 | 85 | 79 |
| Comparative Example 4 | 15 | 84 | 67 |

In the case of Examples 1 and 2, because the increased porosities of the negative electrodes after the pre-lithiation were lowered by compression, the resistance during charging and discharging was lowered due to the improved contact between the active materials, thereby improving the first-cycle charge/discharge efficiency and cycle performance. On the contrary, in the case of Comparative Examples 1 and 2, because the contact between the active materials was poor due to the very high porosities of the negative electrodes, resistance was high during charging/discharging, which resulted in degraded first-cycle charge/discharge efficiency and cycle performance. Also, in the case of Comparative Examples 3 and 4, when the negative electrodes were compressed with a very strong force and porosity is excessively lowered, the active material was broken, and the electrode was damaged, which rather resulted in degraded first-cycle charge/discharge efficiency and cycle performance.

The invention claimed is:

1. A method of manufacturing a negative electrode for lithium secondary batteries, comprising:
    manufacturing a negative electrode by forming a negative electrode active material layer on a negative electrode current collector, wherein the forming of the negative electrode active material layer comprises coating the negative electrode current collector with a negative electrode active material, and first compressing the negative electrode active material on the surface of the negative electrode current collector to form the negative electrode active material layer;
    manufacturing a pre-lithiated negative electrode by impregnating the negative electrode with a pre-lithiation solution to perform a pre-lithiation process; and
    second compressing the pre-lithiated negative electrode to adjust a porosity of the pre-lithiated negative electrode,
    wherein the negative electrode active material comprises a silicon-based negative electrode active material and a carbon-based negative electrode active material,
    wherein a weight ratio of the silicon-based negative electrode active material to the carbon-based negative electrode active material is 1:99 to 50:50,
    wherein the porosity of the pre-lithiated negative electrode is in a range of 20% to 45%,
    wherein the porosity is calculated by the following Equation 1:

Porosity (%)=[1−(Real Density/True Density)]×100    Equation 1 wherein real density is a density of the negative electrode active material layer comprising pores, and true density is a solids density of the negative electrode active material layer without pores.

2. The method of claim 1, wherein the porosity of the pre-lithiated negative electrode is in a range of 25% to 35%.

3. The method of claim 1, wherein the pre-lithiation process comprises electrochemically charging the negative electrode using a lithium metal as a counter electrode after the negative electrode is impregnated with the pre-lithiation solution.

4. The method of claim 1, wherein the impregnation is performed at a temperature of 10° C. to 200° C. for 2 hours to 48 hours.

5. The method of claim 3, wherein the charging is performed to 5% to 35% of a charge capacity of the negative electrode at a current density of 0.1 mA/cm$^2$ to 10 mA/cm$^2$.

6. The method of claim 1, wherein the compression is performed at a linear pressure of 0.1 kN/cm to 30 kN/cm.

7. The method of claim 1, wherein the pre-lithiation solution comprises a lithium salt and an organic solvent.

8. The method of claim 1, wherein manufacturing of the pre-lithiated negative electrode comprises:

impregnating the negative electrode with the pre-lithiation solution to perform a pre-lithiation process; and washing the negative electrode with an organic solvent.

9. The method of claim 8, wherein washing is performed at a temperature of 10° C. to 200° C. for 1 minute to 3 hours using the organic solvent.

10. A method of manufacturing a lithium secondary battery comprising:

manufacturing a negative electrode as defined in claim 1;

manufacturing a positive electrode;

placing a separator between the negative electrode and the positive electrode; and injecting an electrolyte solution into the lithium secondary battery.

11. The method of claim 1, wherein the method consists of the steps of manufacturing the negative electrode, first compressing the negative electrode active material, manufacturing the pre-lithiated negative electrode, and second compressing the pre-lithiated negative electrode.

12. The method of claim 1, wherein the step of first compressing the negative electrode active material and the step of second compressing the pre-lithiated negative electrode are performed before and after the step of manufacturing the pre-lithiated negative electrode, respectively.

13. The method of claim 1, wherein the pre-lithiation solution comprises LiPF$_6$ dissolved to a concentration of 1 M in a solvent comprising ethylene carbonate (EC) and ethyl methyl carbonate (EMC) mixed at a volume ratio of 3:7 and 2% by weight of fluoroethylene carbonate (FEC).

* * * * *